United States Patent
Kleider et al.

[19]

[11] Patent Number: 6,084,919
[45] Date of Patent: Jul. 4, 2000

[54] COMMUNICATION UNIT HAVING SPECTRAL ADAPTABILITY

[75] Inventors: John Eric Kleider; Jeffery Scott Chuprun, both of Scottsdale; William Michael Campbell, Phoenix; Chad Scott Bergstrom, Chandler, all of Ariz.

[73] Assignee: Motorola, Inc., Schaumburg, Ill.

[21] Appl. No.: 09/016,025

[22] Filed: Jan. 30, 1998

[51] Int. Cl.[7] .................................................. H04B 15/00
[52] U.S. Cl. ......................... 375/285; 375/346; 375/296
[58] Field of Search .................................. 375/130, 140, 375/144, 146, 147, 148, 259, 285, 316, 346, 295, 296; 371/43.1; 370/208, 209

[56] References Cited

U.S. PATENT DOCUMENTS

| | | | |
|---|---|---|---|
| 4,756,007 | 7/1988 | Qureshi et al. | 375/37 |
| 5,345,470 | 9/1994 | Alexander | 375/144 |
| 5,504,776 | 4/1996 | Yamaura et al. | 375/208 |
| 5,541,955 | 7/1996 | Jacobsmeyer | 375/222 |
| 5,574,747 | 11/1996 | Lomp | 375/144 |
| 5,592,469 | 1/1997 | Szabo | 370/342 |
| 5,629,929 | 5/1997 | Blanchard et al. | 375/148 |
| 5,673,290 | 9/1997 | Cioffi | 375/260 |
| 5,805,585 | 9/1998 | Javitt et al. | 375/148 |
| 5,943,362 | 8/1999 | Saito | 375/144 |

FOREIGN PATENT DOCUMENTS 9828868 7/1998 WIPO .

OTHER PUBLICATIONS

An article entitled "The Application Of Acoustic Charge Transport Technology To Wideband Communication Systems", by Charles R. Ward and Stephen P. Reichart from National Telesystems Conference, 1992.

An article entitled "Adaptive Coding Rate And Processing Gain Control For Cellular DS/CDMA Systems", by Sadayuki Abeta, Seiichi Sampei, Norihiko Morinaga from the Faculty of Engineering, Osaka University, Osaka, Japan, IEEE International Conference on Universal Personal Communications Record, 1995.

An article entitled "Adaptive Data Transmission Scheme For DS/SSMA System In Bandlimited Rayleigh Fading Channel", by Ye Hoon Lee and Sang Wu Kim from the Department of Electrical Engineering, Korea Advanced Institute Of Science and Technology, Taejon, Korea, Fourth IEEE International Conference on Universal Personal Communications Record, 1995.

An article entitled Theory Of Spread–Spectrum Communications—A Tutorial, by Raymond L. Pickholtz, Donald L. Schilling and Laurence B. Milstein, from IEEE, 1982.

*Primary Examiner*—Chi H. Pham
*Assistant Examiner*—Bryan Webster
*Attorney, Agent, or Firm*—John C. Scott; Frank J. Bogacz

[57] ABSTRACT

The present invention relates to a communications system (100) that is capable of adapting to an unknown or varying spectral environment in a channel (14) between two communications units (12, 16). The system (100) maintains a spectral profile of the channel (14) and uses the spectral profile to determine appropriate transmit parameters for the system (100). The system (100) can be programmed to provide an optimal transmit signal for achieving a predetermined performance goal (such as, for example, maximum data rate at a given bit error rate (BER)) in light of the spectral environment in the channel (14). In one embodiment, the spectral profile is maintained in a spectrum table memory (27) that is periodically (or continuously) updated.

20 Claims, 6 Drawing Sheets

COMMUNICATION UNIT HAVING SPECTRAL ADAPTABILITY

FIELD OF THE INVENTION

The invention relates in general to communications systems and, more particularly, to communications systems that are capable of operating in adverse spectral environments.

BACKGROUND OF THE INVENTION

The number of applications using radio frequency energy is large and rapidly increasing. From wireless communications systems (voice and data) and wireless internet applications to automobile collision avoidance systems, the airwaves are filled with radio frequency signals for performing various functions. Because of the great number of radio frequency systems in operation, interference between systems is not uncommon. This interference can cause a decrease in the performance of one or more of the systems involved (such as an increase in the bit error rate of a communications system) and, therefore, should be avoided. One way to avoid such inter-system interference is to carefully plan the assignment of frequencies to the various systems so that nearby systems do not use similar or overlapping frequency bands. However, because many of today's radio frequency applications are non-stationary (i.e., mobile) applications, planning based on the physical location of the systems is difficult if not impossible. Another option is to assign a completely different frequency band to each application so that there is no frequency overlap between systems. This technique is not practical, however, because there is not enough spectrum available to service the growing number of RF applications in this fashion. In addition, this technique does not address interference caused by the transmission of spurious "out of band" signals, such as those created by system nonlinearities (e.g., amplifier intermodulation distortion), that create adjacent channel interference.

In addition to unintentional interference between systems, as described above, there is also the problem of intentional interference (i.e., jamming). This type of interference generally occurs in military applications where one group attempts to interfere with the communications of an enemy group by transmitting signals in a similar frequency range as the enemy group to block or overpower the communications signals. As can be appreciated, such interference can seriously degrade or destroy the quality of the communications.

Therefore, a need exists for a method and apparatus for use in a communications system that is capable of reducing the effect of interference on the data signal or existing signals.

DETAILED DESCRIPTION OF THE DRAWINGS

Figure 1:
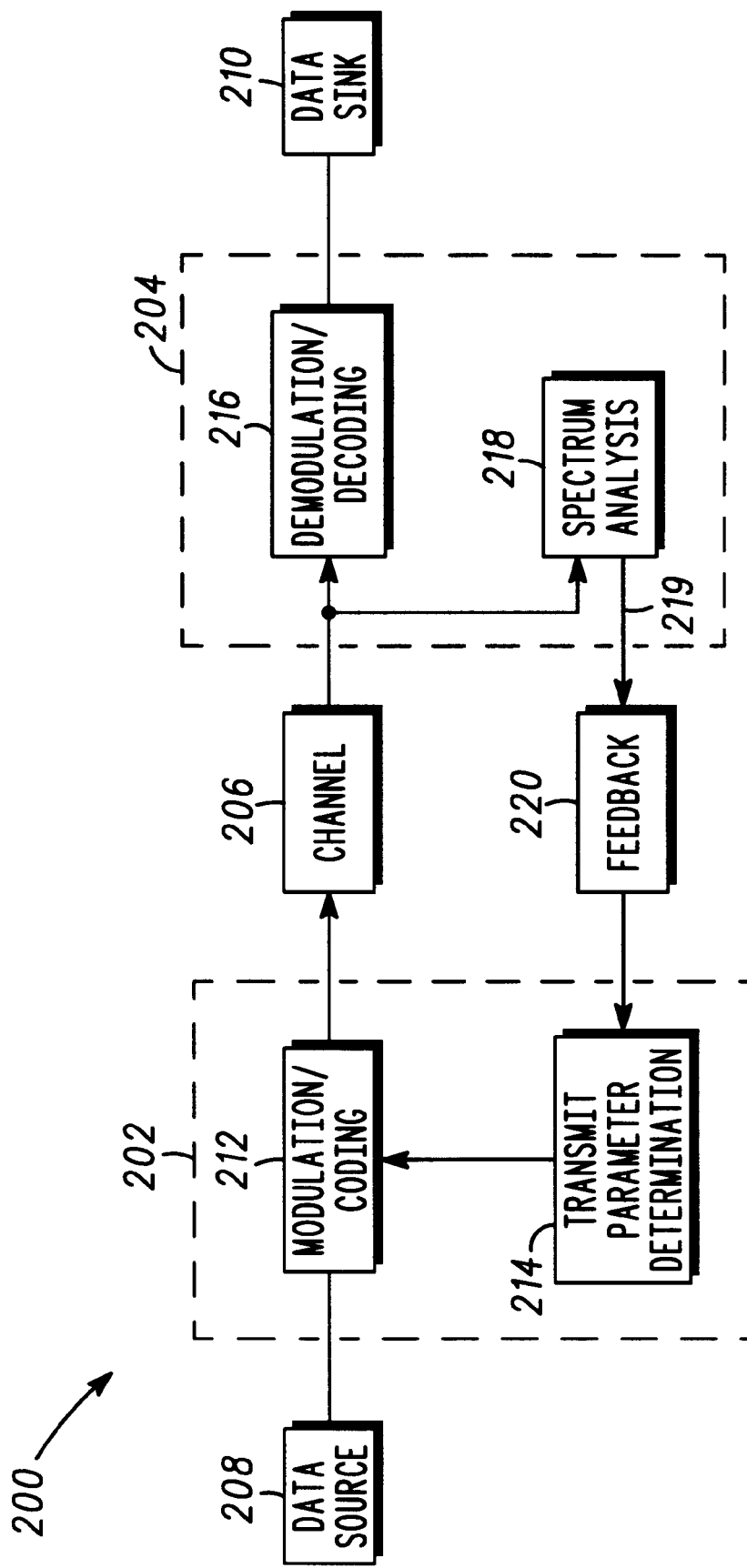
FIG. 1 is a high level block diagram illustrating a communications system in accordance with one embodiment of the present invention.

The present invention relates to a communications system that is capable of reducing the adverse effects of potentially interfering signals that appear within the system's operational bandwidth. The system accomplishes this by monitoring and adapting to the spectral environment about the system. That is, the system monitors the spectral makeup within a frequency band of interest (which, in a preferred embodiment, is the operational bandwidth of the system) and varies its transmit signal parameters based on the detected spectral conditions. By adapting to the spectral environment, the system can make very efficient use of available spectrum. In one embodiment, for example, the system uses portions of the spectrum that are not presently being used by other systems in the area, to perform communications. In another embodiment, the system uses the detected spectrum to determine how to adjust the power level and/or processing gain of its transmit signal so that it does not interfere with other systems in the area, even though overlap between frequency bands is occurring. The system can be programmed to provide an optimal transmit signal for achieving a predetermined performance goal (such as, for example, maximum data rate at a given bit error rate (BER)) in light of the surrounding spectral environment. In addition, the system is capable of operation in realtime.

One advantage of the present invention is that it allows a communications system to overlay existing military and commercial bands with reduced or minimal interference from or to other systems using those bands. That is, the invention can, for example, allow a communications system to achieve a relatively high performance level in the midst of transmissions from other systems. This greatly increases the number of applications that can be implemented within a given bandwidth. The invention can also, for example, allow a communications system to maximize the quality of service (e.g., data, speech, imagery, and/or video) provided to users of the system. Furthermore, the invention can provide a significant increase in the range of operation of a communications system.

As described in more detail below, the principles of the present invention can be, and preferably are, implemented in a spread spectrum communications system. A spread spectrum communications system is a system where the bandwidth of the transmitted radio frequency signal is wider than that required by the data rate and modulation type of the underlying information signal. That is, a second layer of modulation is used that "spreads" the spectrum of the modulated information signal to provide a number of important advantages. For example, spread spectrum systems are generally better at rejecting interference than are other types of communications systems. In addition, spread spectrum systems can support the use of code division multiple access (CDMA) techniques to provide a plurality of separate communication channels in a given bandwidth. Another advantage of spread spectrum techniques is that they are conducive to signal hiding in secure communications applications. Spread spectrum systems are also capable of high resolution ranging. Various methods, such as direct sequence spread spectrum (DSSS) and frequency hopping spread spectrum (FHSS), can be used to spread the bandwidth of the transmit signal.

FIG. 1 is a high level block diagram of a system 200 in accordance with one embodiment of the present invention. The system 200 includes a first communication unit 202 that communicates with a second communication unit 204 via a channel 206. The first communication unit 202 receives input data from a data source 208 and processes the data to generate a transmit signal for delivery to the channel 206. The second communication unit 204 receives a signal from the channel 206 (which is a modified version of the transmit signal) and processes it to recover data from the signal. The second communication unit 204 then delivers the recovered data to a data sink 210. Although FIG. 1 represents "simplex" communications, the first communication unit 202 and the second communication unit 204 can each be capable of "full duplex" operation.

The first communication unit 202 includes a modulation/coding unit 212 and a transmit parameter determination unit 214. The modulation/coding unit 212 receives the input data from the data source 208 and modulates and/or encodes the data based on one or more control signals from the transmit parameter determination unit 214. The modulated/coded signal (i.e., the transmit signal) is then transmitted into the channel 206. As will be described in greater detail, the transmit parameter determination unit 214 calculates optimum transmit parameters using spectrum based data from the second communication unit 204.

The second communication unit 204 includes a demodulation/decoding unit 216 and a spectrum analysis unit 218. The demodulation/decoding unit 216 receives the modified transmit signal from the channel 206 and removes the modulation/coding from the signal. In one embodiment, the control signal(s) from the transmit parameter determination unit 214 are made part of the transmit signal and are thus used by the demodulation/decoding unit 216 to remove the modulation/coding. The spectrum analysis unit 218 monitors the channel 206 to identify signal components within the channel 206 that can cause interference. In one embodiment, the spectrum analysis unit 218 determines the spectral profile of the channel 206 independent of the transmitted data. This feature distinguishes the present invention from prior art channel sounding techniques.

The spectrum analysis unit 218 transfers information indicative of the spectral profile of the channel 206 back to the transmit parameter determination unit 214 via an output 219 and a feedback channel 220. The transmit parameter determination unit 214 then uses the spectrum information to determine optimal transmit parameters in light of the spectral profile. In this regard, the transmit parameter determination unit 214 can include a processor that is programmed to calculate transmit parameters that are optimized for achieving a predetermined system performance goal. The first communication unit 202 can transfer the optimal transmit parameters (or a derivative thereof) to one or more other communication units (not shown) in the system 200 for use in transmitting signals to the second communication unit 204.

Figure 2:
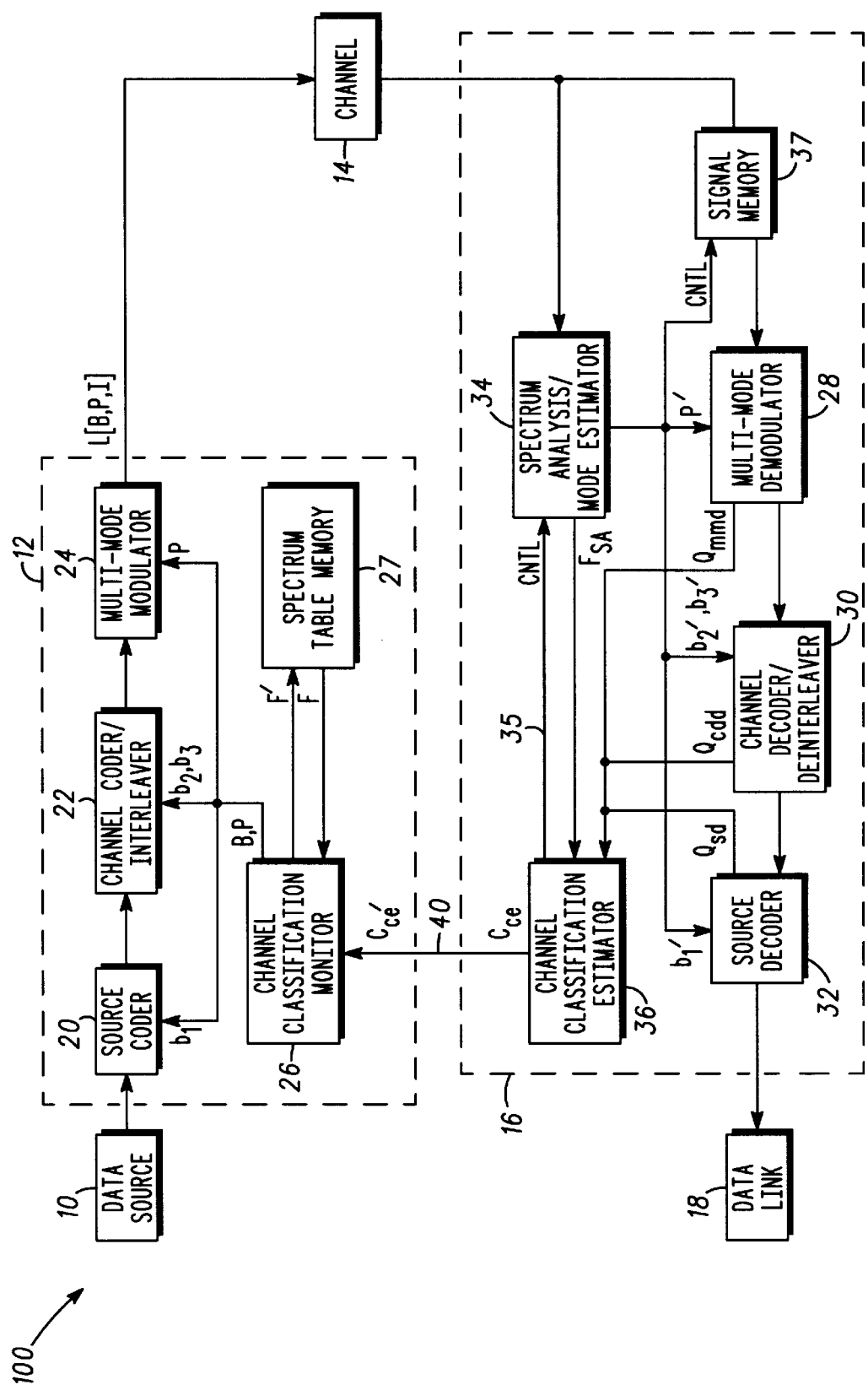
FIG. 2 is a more detailed block diagram illustrating a communications system in accordance with one embodiment of the present invention.

FIG. 2 is a more detailed block diagram illustrating a communications system 100 in accordance with one embodiment of the present invention. As illustrated, the communications system 100 includes a data source 10, a transmit unit 12, a communications channel 14, a receive unit 16, and a data sink 18. During operation of the system 100, the data source 10 provides a raw data signal to an input of the transmit unit 12. The transmit unit 12 encodes and modulates the raw data signal and then launches the modified signal onto the channel 14 which carries the signal to the receive unit 16. The receive unit 16 receives the data signal from the channel 14, demodulates and decodes the signal, and then delivers the demodulated/decoded signal to the data sink 18. As one skilled in the art would recognize, the data signal delivered to the data sink 18 may not be an exact replica of the raw data originally generated by the data source 10 due to, for example, noise/interference/jamming in the channel 14.

The data source 10 can be virtually any type of digital data source. For example, the data source 10 can be a source of digital voice signals, digital data signals, and/or digital image and video signals.

The transmit unit 12 includes: a source coder 20, a channel coder/interleaver (CCI) 22, a multi-mode modulator 24, a channel classification monitor 26, and a spectrum table memory 27. As will be described in more detail, the channel classification monitor 26 generates control signals that determine the type of processing that will be applied to the raw data signal from the data source 10 by the other elements in the transmit unit 12. The source coder 20 receives the raw data from the data source 10 and compresses the data based on a control signal, b1, from the channel classification monitor 26. As compression is not always desired, the source coder 20 is an optional part of the system 100. The CCI 22 receives the output signal from the source coder 20 and applies channel coding and interleaving thereto in response to control signals (i.e., b2 and b3) from the channel classification monitor 18. Control signals b1, b2, and b3 will be referred to herein, collectively, by the vector B. The multi-mode modulator 24 processes the output data signal from the CCI 22 based on one or more control signals from the channel classification monitor 26 that will be referred to herein, collectively, by the vector P. Each of the control signals comprising the vector P will control one or more characteristics of the transmit signal. In response to the control signal(s) P, the multi-mode modulator 24 can vary characteristics of the transmit signal, such as, for example, the data rate, symbol rate, and center frequency of the signal, and the type of modulation applied to the signal. The signal characteristics that are variable in a particular implementation of the invention depend upon the specific application. The complete set of control signals (i.e., B and P) define the operating mode of the system 100.

In addition to their processing functions, the source coder 20, the CCI 22, and/or the multi-mode modulator 24 also append information to the data signal relating to the type of modulation/coding applied to the data signal. For example, the source coder 20 may append control signal b1 to the data signal. Similarly, the CCI 22 may append control signals b2 and b3 to the data signal, and so on. In one embodiment of the invention, this modulation/coding information is added to the data signal for eventual use in, among other things, demodulating/decoding the data signal in the receive unit 16.

The spectrum table memory 27 stores spectral information indicative of, among other things, the frequency ranges in the channel 14 that are currently occupied by interference signals. The spectrum table memory 27 can also include comparison/decision circuitry (not shown) for determining whether the current output of the spectrum table memory 27 (i.e., F) should be updated based on a current spectral reading. After transmit processing is complete in the transmit unit 12, the output signal of the multi-mode modulator 24 (i.e., the transmit signal) is transmitted into the channel 14.

The channel 14 can include any type of transmission medium that is capable of carrying a modulated data signal from the transmit unit 12 to the receive unit 16. In this regard, the channel 14 can be either a wireless or a wired connection. In a preferred embodiment of the present invention, the system 100 is a wireless communications system and the channel 14 is a wireless radio frequency link. The channel 14 can include, for example, the radio frequency link between a cellular telephone and a cellular basestation. Alternatively, the channel 14 can include a series of uplinks, crosslinks, and downlinks in a satellite communications system for carrying a signal between two transceiver units on the ground. As will occur in any communications channel, the transmitted signal will be degraded in the channel 14. That is, the transfer function of the channel 14 and interference and noise sources in the channel 14 will modify the transmitted signal to a certain degree. This modified signal is received in the receive unit 16 which must process the signal to recover the original data.

The receive unit 16 includes: a multi-mode demodulator 28, a channel decoder/deinterleaver (CDD) 30, a source decoder 32, a spectrum analyzer/mode estimator (SAME) 34, a channel classification estimator 36, and a signal memory 37. The receive unit 16 receives a signal from the channel 14 via an appropriate signal reception means (not shown), such as a line buffer or an antenna, analog to digital (A/D) converter and possibly a down converter. The signal from the channel 14 (i.e., the receive signal) is delivered to both the signal memory 37 and the SAME 34. The signal memory 37 stores a copy of the receive signal for later use. The SAME 34 processes the read signal to determine estimates of the modulation/coding of the original data signal (i.e., the modulation/coding performed in the transmit unit 12) and to determine a profile of the spectrum in the channel 14. As will be discussed in greater detail, the spectral profile determined by the SAME 34 is used to calculate optimal transmit parameters for use by the system 100. Furthermore, the SAME 34 can also used to dynamically adjust receive parameters, such as channel detection thresholds in a multi-channel receiver embodiment, to reduce, for example, estimated $P_{FA}$.

Because the data signal is degraded in the channel 14, as described above, the modulation/coding information appended to the data signal can be corrupted in the channel 14. As described above, in one embodiment this information is used in the receive unit 16 to demodulate/decode the receive signal. Therefore, the SAME 34 includes means for reading the potentially corrupted modulation/coding information from the receive signal and for determining the validity of the information so read (i.e., whether the information truly represents the modulation/coding information transmitted by the transmit unit 12). Validity of the information can be tested by, for example, comparing it to the apriori set of valid system parameters. If the information from the read signal is found valid, the information (or a derivative thereof) is used as mode estimates B' and P' in the demodulation/decoding process. If the information from the read signal is found to be invalid, the SAME 34 derives the mode estimates B' and P' by other methods. One such method, which is well known in the art, uses interpolation of past valid mode information. Another method uses iteration through values near past valid values until a best quality (e.g., lowest BER) is achieved.

After valid mode estimates B' and P' have been obtained, the SAME 34 transfers the mode estimates to the multi-mode demodulator 28, the CDD 30, and the source decoder 32 for use in demodulating/decoding the read signal. The SAME 34 then instructs the signal memory 37 to transfer a copy of the read signal to the multi-mode demodulator 28 to begin the demodulation/decoding process. The multi-mode demodulator 28, the CDD 30, and the source decoder 32 each perform the inverse function of the multi-mode modulator 24, the CCI 22, and the source coder 20, respectively, using the appropriate mode estimates from the SAME 34.

In addition to mode estimation, as described above, the SAME 34 performs a spectrum analysis on the receive signal to determine the approximate spectral makeup in the channel 14. The SAME 34 then delivers a signal, Fsa, to the channel classification estimator 36 that is indicative of the spectral environment in the channel 14. The SAME 34 uses the mode estimates B' and P' to determine which portions of the detected spectrum correspond to the transmit signal from the transmit unit 12, and these portions are not included in the Fsa signal. That is, the signal sent to the channel classification estimator 36 only indicates spectral components from sources other than the transmit unit 12. The SAME 34 can utilize any of a number of analysis techniques/algorithms to perform the required spectrum analysis. The complexity of the method used depends upon the accuracy required by the system 100. For example, if optimal performance is required, relatively complex and highly accurate spectral scanning techniques can be implemented in the SAME 34. This may require the use of a high-performance processor, such as a digital signal processor (DSP), to perform the necessary operations in a reasonable time. If optimal performance is not a requirement, less complex spectral techniques can be used.

While processing the read signal, the multi-mode demodulator 28, the CDD 30, and the source decoder 32 generate quality metrics that are indicative of the quality of the demodulated/decoded data. For example, the CDD 30 can generate a metric, Qcdd, that is indicative of the bit error rate (BER) of the data signal. Similarly, the multi-mode demodulator 28 and the source decoder 32 can generate metrics, Qmmd and Qsd, that are indicative of, for example, the symbol error rate (SER), the received signal to noise ratio (SNR), and the excessive source distortion (if lossy source coding is used) of the signal. The quality metrics from the multi-mode demodulator 28, the CDD 30, and the source decoder 32 are transferred to the channel classification estimator 36 for use in further validation of the mode estimates B' and P' that were used to demodulate/decode the read signal. If the channel classification estimator 36 finds that the quality metrics are not as expected (given, for example, the spectral makeup of the channel and knowledge of past performance), then it assumes that the mode estimates, B' and P', that were used to demodulate/decode the read signal were in error. The channel classification estimator 36 then instructs the SAME 34, over control line 35, to generate new estimates using, for example, interpolation and/or iteration of past valid mode estimates. The new estimates are then used to reprocess the read signal (a copy of which is still stored in the signal memory 37) in the multi-mode demodulator 28, the CDD 30, and the source decoder 32. New quality metrics are then generated in the multi-mode demodulator 28, the CDD 30, and the source decoder 32 and these new metrics are again compared to expected values in the channel classification estimator 36. This process is repeated until the quality metrics generated in the multi-mode demodulator 28, the CDD 30, and the source decoder 32 are as expected. After acceptable quality metrics have been generated, the output data from the source decoder 32 is delivered to the data sink 18.

The data sink 18 can be virtually any type of data destination and, in general, will depend on the type of data being generated by the data source 10. For example, if the data source 10 is generating speech data, the data sink 18 will most likely be the terminal equipment (e.g., a telephone) of the party that is to receive the speech signal. On the other hand, if the data signal from the source 10 is an image signal, the data sink 18 will most likely be some form of display device.

After acceptable quality metrics have been calculated and a final Fsa signal has been generated in the SAME 34 (using the modified mode estimates), the channel classification estimator 36 transfers a feedback signal containing channel estimates, Cce, to the channel classification monitor 26 in the transmit unit 12, via feedback channel 40. The feedback channel 40 can include virtually any type of feedback path such as, for example, a dedicated RF link or a dedicated time slot in a return communications signal. In the illustrated embodiment, the channel estimates, Cce, include spectrum information derived from the Fsa signal and quality metric information derived from the multi-mode demodulator 28, the CDD 30, and the source decoder 32.

Because the feedback signal can be corrupted in the feedback channel 40, signal validity is checked in the channel classification monitor 26. In one embodiment, for example, channel estimates in the received feedback signal (i.e., Cce') are compared to expected channel parameters in the channel classification monitor 26 to determine their validity. If the channel estimates Cce' are not as expected, they are deemed invalid. The expected channel parameters can be derived using valid past channel data, quality information from the receive unit, and knowledge of the possible rate of change of the channel parameters (for example, it may be known that channel parameters do not normally change very fast in a given location). If it is determined that the channel estimates received in the channel classification monitor 26 (i.e., Cce') are valid, then the monitor 26 can use them to calculate control signals (i.e., B and P) for the source coder 20, the CCI 22, and the multi-mode modulator 24. These control signals are then delivered to the source coder 20, the CCI 22, and the multi-mode modulator 24 for use in generating the next transmit signal. If the channel estimates Cce' are found to be invalid, interpolation/iteration methods can be used in the channel classification monitor 26 to derive valid channel estimates, as described above with respect to the mode estimates. These valid channel estimates are then applied to the source coder 20, the CCI 22, and the multi-mode modulator 24 for use in generating the next transmit signal.

The spectrum table memory 27 is used to store information describing the current spectral environment in the channel 14 (i.e., a spectral profile) for use by the channel classification monitor 26. At any particular time, the memory 27 outputs a signal F indicative of the most recent spectrum information received from the receive unit 16. If newly received spectrum information F' differs only slightly from spectrum information F presently stored in the memory 27, the memory 27 may decide to retain the previous information rather than replace it with the new information. This feature can help to prevent short-term transient oscillation. In addition to storing information relating to the present channel spectrum, the spectrum table memory 27 can also include an archival area for storing information relating to past spectral profiles. Records in the archival area can be time stamped for use in determining spectral trends and for predicting future spectral patterns. In general, the spectrum information will be stored in the form of histograms within the spectrum table memory 27, although other spectrum information may also be appropriate.

It should be appreciated that, although a spectrum analysis unit is not shown in the transmit unit 12 of FIG. 2, channel quality parameters may be derived in either the transmit unit 12, the receive unit 16, or both. Estimation in the transmit unit 12 tends to reduce the required feedback channel bandwidth and therefore provides the highest possible data rate.

Once the channel estimates received from the receive unit 16 (i.e., Cce') have been validated, the channel classification monitor 26 analyzes the estimates to determine optimal transmit parameters. The channel classification monitor 26 then generates the control signals for the source coder 20, the CCI 22, and the multi-mode modulator 24 to achieve these transmit parameters. In accordance with the present invention, a wide range of transmit parameters can be varied in response to the spectrum information sensed by the receive unit 16 (or sensed by the transmit unit 12). In fact, any characteristic of the transmit signal that can result in an improved system performance (in light of the spectral environment) can be changed. For example, the data rate, symbol rate, center frequency, sampling frequency, bandwidth, and/or power level of the transmit signal can be adjusted. In addition, in a spread spectrum application, the processing gain of the system can be varied. As described above, a spread spectrum system is one in which the bandwidth of a modulated data signal is increased, or spread, to achieve certain advantages. The processing gain of a spread spectrum system quantifies a reduction in the effect of an interfering signal in the system, caused by the spreading of the transmit signal. In this regard, processing gain can be taken as the ratio between the signal to noise ratio (SNR) of the spread signal and the SNR of the unspread (modulated data) signal (where spreading can be accomplished using, for example, direct sequence psuedo noise convolution or frequency hopping as known by those of skill in the art). In general, the processing gain will be approximated by the ratio between the bandwidth of the spread signal and the bandwidth of the unspread signal. Therefore, the processing gain can be changed by varying either the bandwidth of the modulated data signal (such as by changing the data rate) or by varying the amount of spread added to the modulated data signal. Data rate can be changed by varying the compression ratio of the data or by changing the delivery rate of a fixed amount of data. Another transmit parameter that can be varied in accordance with the present invention is the type of modulation used to modulate the data signal from the data source 10. That is, the modulation can be changed from a first type of modulation, such as quadrature amplitude modulation (QAM), to a second type of modulation, such as frequency shift keying (FSK), based on the content of the spectrum. Again, the change in transmit parameters will be performed to achieve a particular system performance goal in light of the spectral environment.

To analyze the channel estimates and determine the optimal transmit parameters, the functions of the channel classification monitor 26 can be performed within a processor, such as a conventional microprocessor or a digital signal processor (DSP). The channel classification monitor 26 can also include a memory for storing analysis and parameter determination routines and algorithms. In general, the algorithm used by the channel classification monitor 26 to determine the optimal transmit parameters will depend on the performance goals of the communications system 100. For example, if a performance goal is to achieve a maximum data rate without exceeding a predetermined BER, a first algorithm will be used. Alternatively, if low detectability of the transmit signal is the goal, a second, different algorithm will be used. In one embodiment, the algorithm that is used to determine the optimal transmit parameters is selectable from a library of algorithms in the memory of the channel classification monitor 26. This allows for flexibility in choosing/changing system performance goals.

During normal system operation, the transmit parameters that are chosen by the channel classification monitor 26 will depend on the spectral environment in the channel 14. An option may be provided, however, for deactivating or overriding the spectrum-based determination functionality if certain conditions exist. In such a case, default parameter values can be used to create the transmit signal. This option could be used when a particular performance goal, such as absolute minimum detectability, is desired regardless of the contents of the channel spectrum. In addition, default parameter values can be used to initialize communications before a clear picture of the spectral environment is obtained. Such default values can be chosen based upon, for example, a coordinate grid or geostationary location table.

Figure 3:
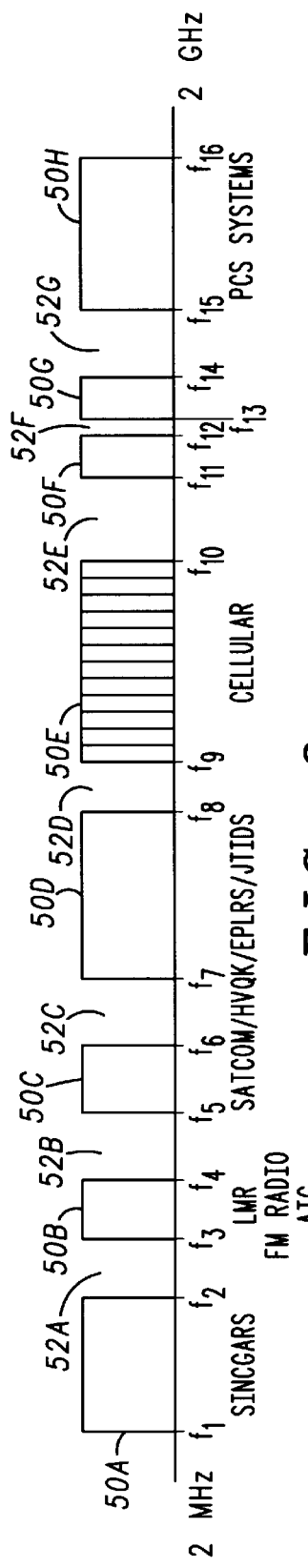
FIGS. 3 and 4 are graphs illustrating possible channel spectrums that may be detected in accordance with the present invention.

FIG. 3 is a graph illustrating a possible channel spectrum that may be detected by the receive unit 16. As illustrated, a plurality of spectral components 50A–50H are identified in the spectrum with a plurality of spectral gaps 52A–52G between components. The spectral components 50A–50H represent a plurality of radio frequency systems that are operating at a particular moment in time. In one embodiment of the present invention, the system 100 will attempt to fill in one or more of the spectral gaps 52A–52G with the transmit signal. This may require, for example, a shift in the center frequency of the transmit signal to a frequency centered in one of the gaps. If none of the gaps are wide enough to accept the entire bandwidth of the spread signal, the signal may have to be split between two or more of the gaps. Alternatively, the bandwidth of the spread signal can be reduced by, for example, changing the modulation type of the underlying data signal or by reducing the level of spreading used to spread the modulated data signal. By filling in the spectral gaps 52A–52G, a maximum data rate can be achieved despite the crowded spectrum. Of course, the gaps that are chosen for use must reside within the operational bandwidth of the system 100. In another embodiment, the particular gaps that are used to carry the transmit signal are user selectable.

Figure 4:
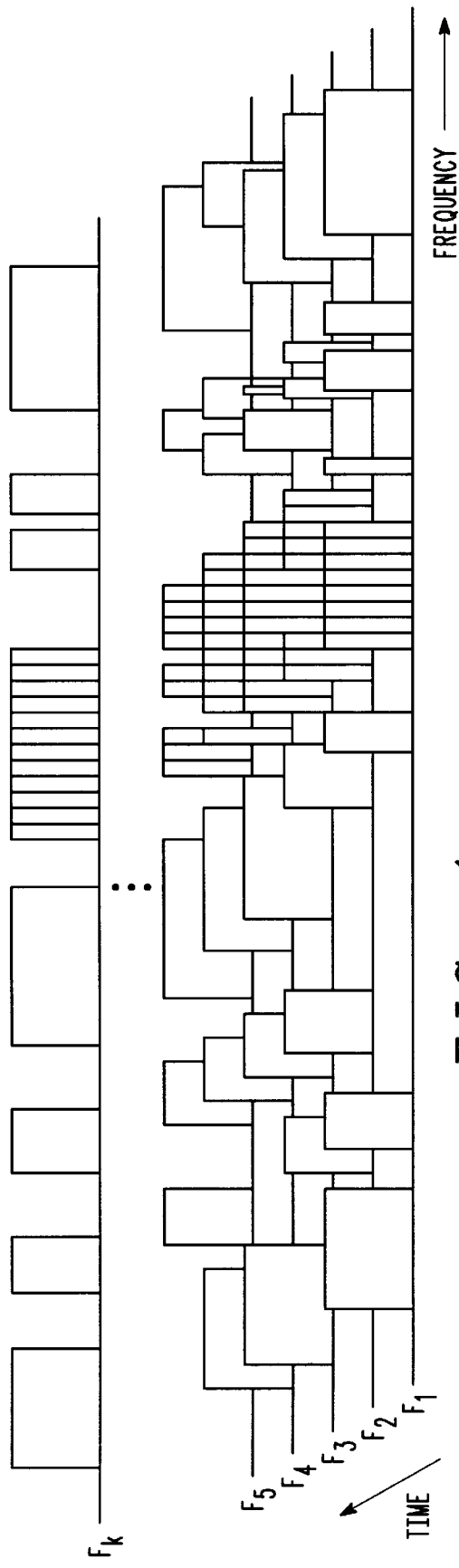

FIG. 4 is a plurality of overlapping graphs illustrating how the detected spectrum can change over time. That is, each graph illustrates the spectrum at a particular instant in time. As shown, some of the spectral components disappear from one instant in time to the next, only to reappear at a later instant in time. Similarly, the bandwidth of the components can change with time. As described previously, the spectrum table memory 27 stores a signal indicating the content of the channel spectrum at a given moment in time. In one embodiment of the invention, with reference to FIG. 3, the memory 27 stores a signal F having the following format:

$$F(t)=[f1,f2,f3,f4,f5,f6,f7,f8,f9,f10,f11,f12,f13,f14,f15,f16]$$

where f1–f16 are frequency values denoting the band edges of the spectral components 50A–50H. As shown in FIG. 3, the first frequency value (i.e., f1) in the signal represents the lower band edge of the first component 50A. Accordingly, the second and third frequency values represent the band edges of the first spectral gap 52A, the fourth and fifth values represent the band edges of the second spectral gap 52B, and so on. As shown, the signal F is a function of time, meaning that both the number of frequency values and the magnitude of the frequency values (i.e., the frequencies represented by the values) can change with time.

Figure 5:
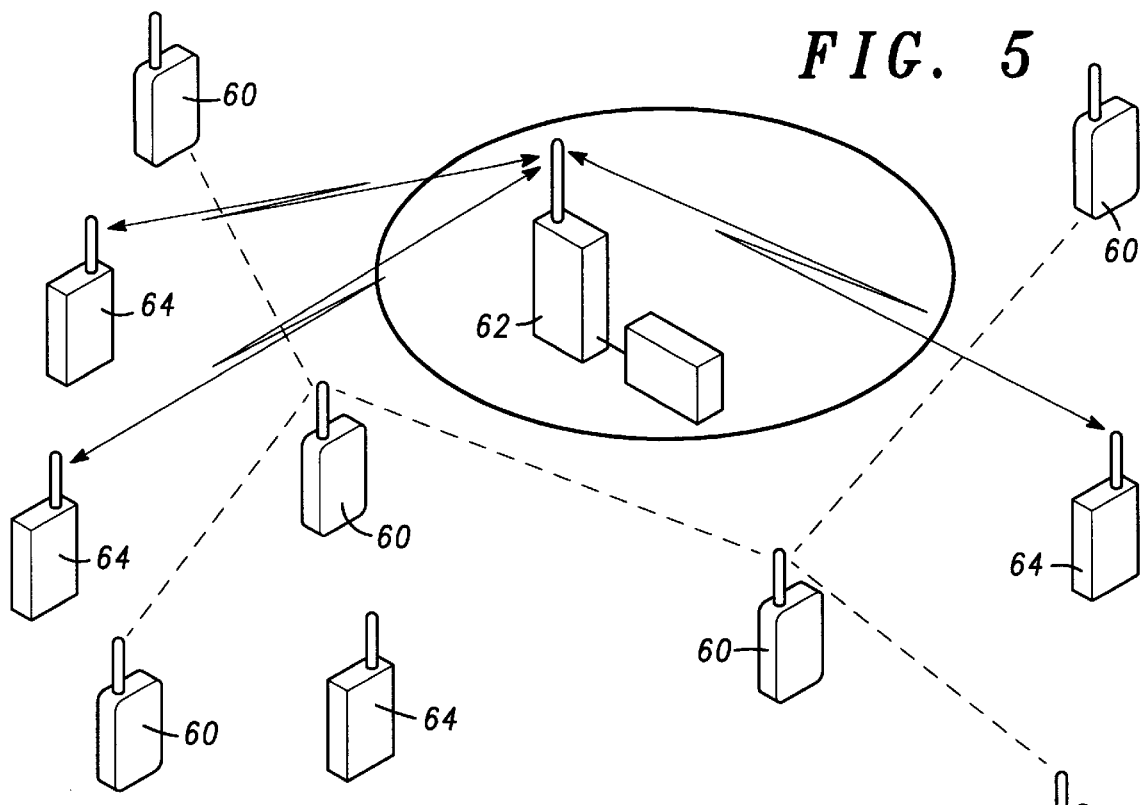
FIG. 5 is a diagram illustrating a wideband communications system overlaying a narrowband communications system.
Figure 6:
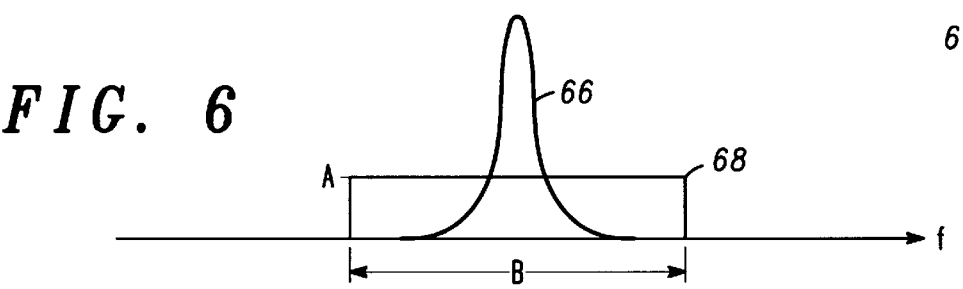
FIGS. 6–8 are graphs illustrating spectral adjustments that can be made in the wideband communications system of FIG. 5 to achieve reduced interference in accordance with one embodiment of the present invention.
Figure 7:
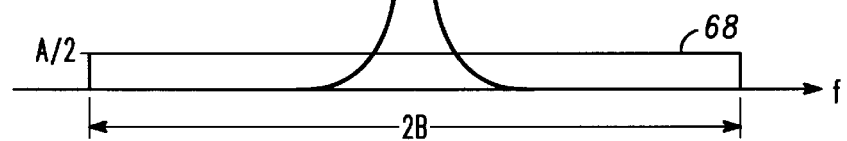
Figure 8:
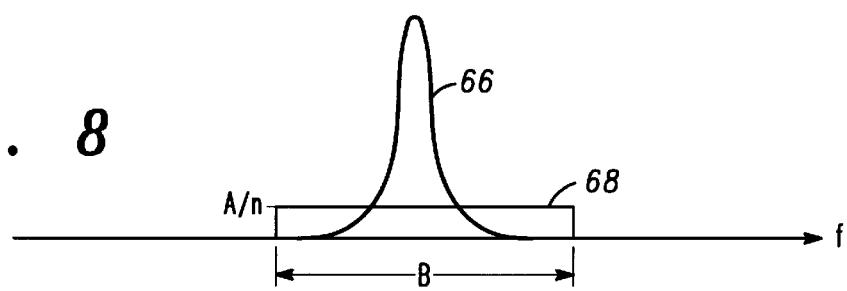

FIG. 5 illustrates another scenario in which the principles of the present invention can be practiced. As shown, a wideband spread spectrum communications system is overlaying a narrowband land mobile radio (LMR) or cellular communications system. The wideband system is comprised of a plurality of wideband communicators 60 that are mobile within a predetermined region. The narrowband system includes a basestation 62 and a plurality of narrowband communicators 60,64 that are mobile within an overlapping region. Each of the wideband communicators 60 are capable of communicating with any of the other wideband communicators 60 via a direct RF link between individual communicators 60. The narrowband communicators 64, on the other hand, communicate with other communications units via an RF link to the basestation 62, which can be connected to a public telephone network. The operational frequency bands of the narrowband system and the wideband system are overlapping. That is, the narrowband system can operate entirely within the bandwidth of the wideband system. This scenario may be purposefully planned so that increased use of the available spectrum is achieved. The problem is that the wideband system should not unduly interfere with the operation of the narrowband system (and vice versa). In past systems, this interference would have been hard to avoid as the transmit characteristics of both systems would have been fixed. In accordance with the present invention, the transmit signal parameters of the wideband system (or the narrowband system) can be varied to achieve minimal interference in the narrowband system (or the wideband system). FIGS. 6–8 are spectrum diagrams illustrating how this can be done.

FIG. 6 illustrates a narrowband signal 66 from the narrowband system overlapping a wideband signal 68 from the wideband system. In accordance with the invention, means can be provided within the wideband communicators 60 for performing a spectrum analysis to identify the components 66, 68 illustrated in FIG. 6. In response to the identified spectral components of FIG. 6, the wideband system can further spread the wideband signal 68 (e.g., by increasing the processing gain) so that it presents less interference (i.e., less energy at each frequency) in the narrowband system, as illustrated in FIG. 7. The wideband system can then either (1) perform some form of interference cancellation to remove the effects of the narrowband interference 66 within its band, or (2) further adapt its signal parameters to improve bit error rate in light of the narrowband interference 66. In addition (or alternatively), as illustrated in FIG. 8, the wideband system can adjust its transmit power level (and, if required, also reduce the data rate) to reduce interference with the narrowband system and maintain a successful link. This method is particularly useful if no further spreading of the wideband transmit signal is possible such as when, for example, lower power narrowband signals are present adjacent to the channel bandwidth. The wideband system, for example, can utilize terrain based path loss calculations to determine a minimum amount of transmit power that will allow communications to continue in the wideband system (at an appropriate error rate) while having reduced impact on the narrowband system. In another alternative, as described above, the wideband signal can change its transmit characteristics to fill in spectral gaps between narrowband transmissions.

An advantageous feature of the present invention is that it can provide a variable level of detectability and/or resistance to jamming based on detected spectral conditions. For example, if large jamming signals are detected in the operational frequency band of the system 100, the processing gain of the system can be increased to reduce the effect thereof. Similarly, if the spectrum indicates that hostile entities may be attempting to intercept transmissions of the system 100, the processing gain (or other parameters) can be varied to drop the signal strength below the noise floor (such as by further spreading the transmit bandwidth). In one embodiment of the present invention, the channel classification monitor 26 is programmed to automatically set a processing gain which allows the system 100 to operate at a specific BER based on a ratio between average detected jammer power and average signal power. In another embodiment, improved system performance (e.g., a reduction in detected BER) is achieved by decreasing the unspread bandwidth of the data signal while keeping the bandwidth of the spread signal constant. Other scenarios are also possible.

In accordance with the present invention, spectrum updates can be performed in a periodic manner. The frequency with which updates are performed will depend, for the most part, on the particular implementation. For example, if a communications system is located in an area where spectral conditions within a band of interest are constantly in flux, such as in a city where cellular/PCS use is high, updates will have to be performed relatively frequently. In an area of low spectral activity, such as in a remote desert location, updates can be performed less frequently. In a multichannel transmit/receive system, the receive detection characteristic can be updated to compensate for component aging (e.g., amplifier drift and environmental extremes). As described above, spectrum updates will generally be recorded by changing the spectrum profile stored in the spectrum table memory 27. If appropriate processing means are provided, spectrum updates can be performed continuously and in realtime, with no appreciable delay in the provision of communication services.

Figure 9:
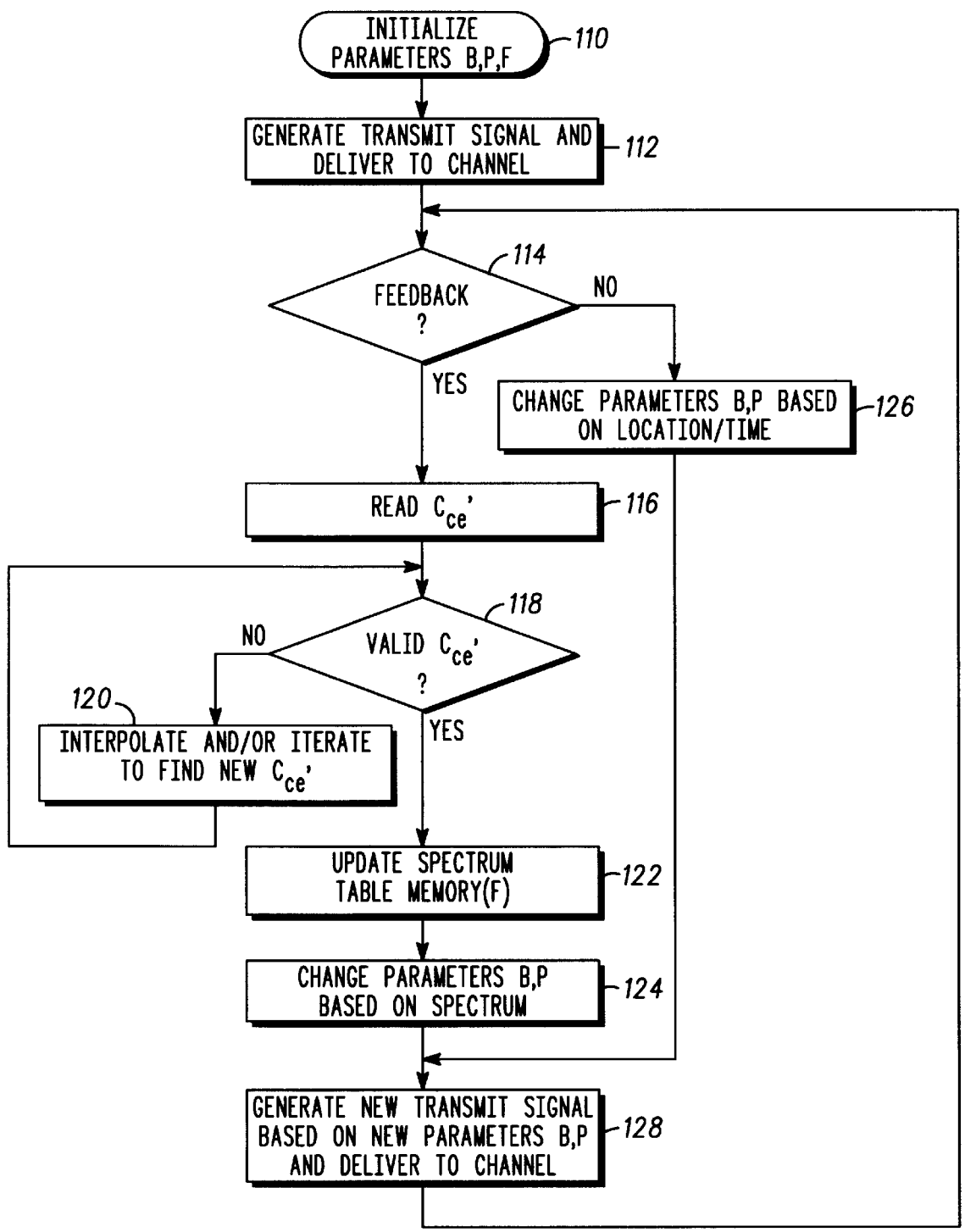
FIG. 9 is a flowchart illustrating the operation of the transmit unit of FIG. 2 in one embodiment of the present invention.
Figure 10:
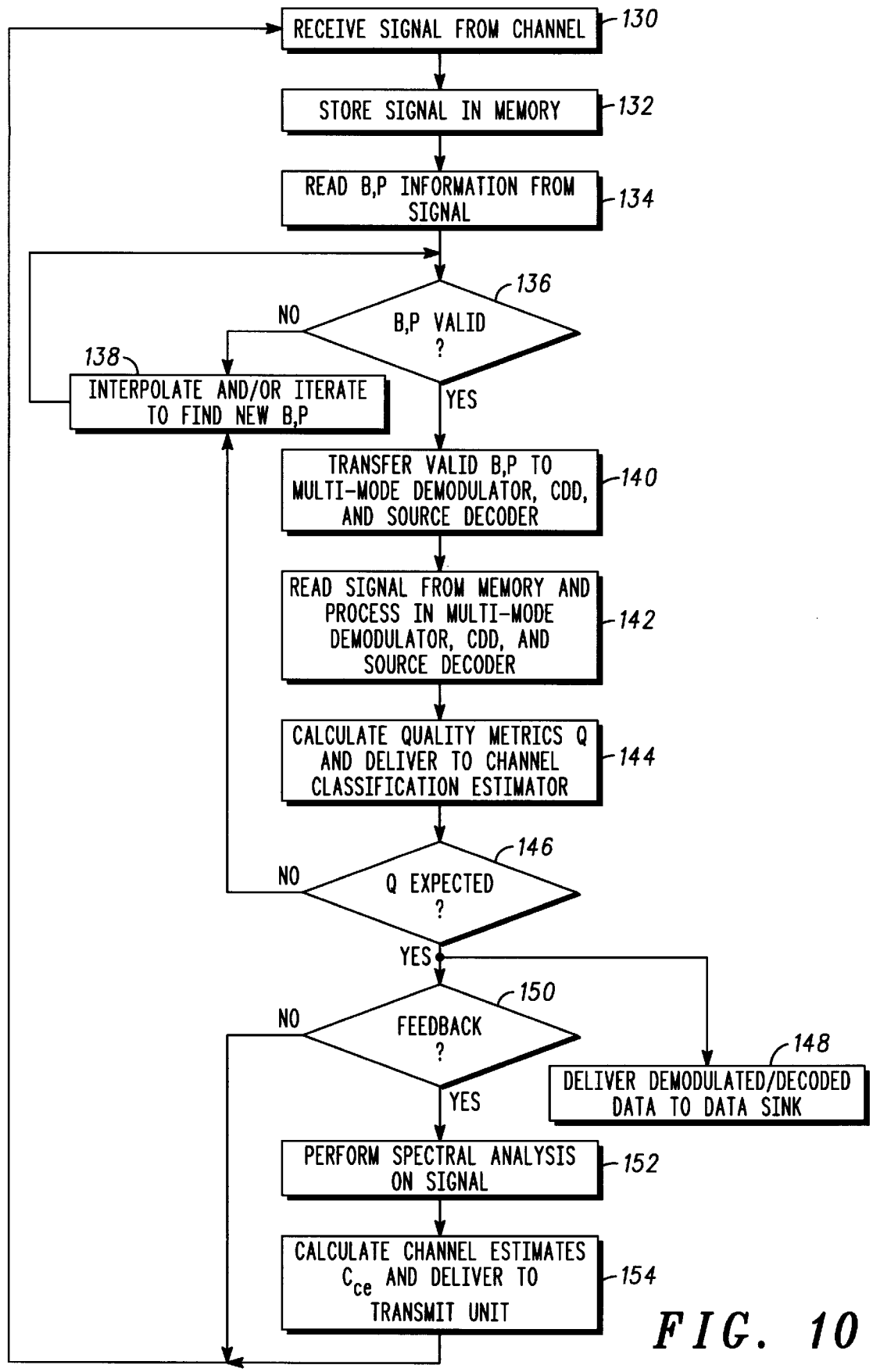
FIG. 10 is a flowchart illustrating the operation of the receive unit of FIG. 2 in one embodiment of the present invention.

FIGS. 9 and 10 are flowcharts illustrating the operation of the transmit unit 12 and the receive unit 16 of FIG. 2, respectively, in one embodiment of the present invention. With reference to FIG. 9, the transmit unit begins operation by initializing parameters in the system 100 (step 110). Because the spectral conditions in the channel 14 have not yet been measured, the control signals (i.e., B and P) for the source coder 20, the CCI 22, and the multi-mode modulator 24 are set to default values, or values from past measurement and collection sessions, by the channel classification monitor 26. In addition, the signal F stored in the spectrum table memory 27 is initialized to an initial spectrum profile that can be based, for example, on a coordinate grid or geostationary location table or by transmit spectrum awareness means using TDOA techniques, emitter identification, and tracking external spectrum update information. After the parameter values have been initialized, a transmit signal is generated by processing a data signal from the data source 10 in the source coder 20, the CCI 22, and the multi-mode modulator 24 in accordance with the default control signals (step 112). The transmit signal is then delivered to the channel 14 for transfer to the receive unit 16.

The transmit unit 12 next determines whether the feedback channel 40 is presently available for use (step 114). The feedback channel 40 may not be available if, for example, the system is in a broadcast mode or only a simplex or half-duplex link is used such as in push-to-talk radio operations. If the feedback channel 40 is available, the channel classification monitor 26 waits for and reads the next feedback signal (which includes the potentially corrupted channel estimates Cce') from the feedback channel 40 (step 116). The channel classification monitor 26 then determines whether the channel estimates Cce' are valid (step 118). If the channel estimates are not valid, the channel classification monitor 26 performs interpolation and/or iteration until valid channel estimates have been found (step 120). This process implies a multi-frame transmit/receive data structure whereby elided channel data is estimated between valid bounds. Once valid channel estimates have been found, the channel classification monitor 26 updates the spectrum table memory 27 with the new spectrum information from the channel estimates Cce' (step 122). The channel classification monitor 26 then determines new parameter values for control signals B and P based on the new spectrum information (step 124). If the feedback channel 40 is not available in step 114, the channel classification monitor 26 determines new parameter values for control signals B and P based on other considerations, such as the location of the receive unit and the time of day (step 126) or via transmit spectral awareness means. In either case, the new parameter values are delivered to the source coder 20, the CCI 22, and the multi-mode modulator 24 and a new transmit signal is generated and delivered to the channel 14 (step 128). The transmit unit 12 then checks again to see whether the feedback channel 14 is available (step 114) and the above process is repeated.

With reference to FIG. 10, the receive unit 16 begins operation by receiving a signal from the channel 14 (step 130). The receive signal is then transferred to both the signal memory 37 and the SAME unit 34. The signal memory 37 stores a copy of the receive signal for later use (step 132). The SAME unit 34 processes the read signal to read the potentially corrupted modulation/coding information (step 134). The SAME unit 34 then tests the modulation/coding information thus derived to determine whether it is valid (step 136). If the information is valid, the information is used as the mode estimates B', P'. If the information is not valid, the SAME uses interpolation and/or iteration (assuming multi-frame buffering) to derive new mode estimates B', P' (step 138). The new estimates are again tested for validity (step 136) and the process is repeated until valid values are found. The valid B', P' values are then transferred to the multi-mode demodulator 28, the CDD 30, and the source decoder 32 (step 140). The read signal is then read from the signal memory 37 and processed in the multi-mode demodulator 28, the CDD 30, and the source decoder 32 (step 140) in accordance with the valid B', P' values (step 142).

Quality metrics are calculated in the multi-mode demodulator 28, the CDD 30, and the source decoder 32, to quantify the effectiveness of the demodulation/ decoding of the read signal, and the quality metrics are delivered to the channel classification estimator 36 (step 144). The channel classification estimator 36 then compares the quality metrics to expected quality values that are based upon the evolution of each individual metric and the combined metric (step 146). An example would be to check if Qsd is as expected given Qcdd, Qmmd, P', and B'. If the quality metrics are not as expected, the channel classification estimator 36 signals the SAME unit 34 to use interpolation and/or iteration to derive new B', P' values and the demodulation/decode cycle is repeated (steps 138, 136, 140, 142, 144, and 146) using the new values. If the quality metrics are as expected, the demodulated/decoded data is delivered to the data sink 18 (step 148).

The channel classification estimator 36 then determines whether a feedback channel 40 is currently available (step 150). If a feedback channel 40 is not available, the receive unit 16 begins processing of the next receive signal (step 130). If a feedback channel 40 is available, the SAME 34 is instructed to retrieve the read signal from the signal memory 37 and to perform a final spectrum analysis on the signal (step 152). The SAME 34 then produces a final Fsa signal for the channel classification estimator 36 using the latest B', P' values derived during demodulation/decoding. The channel classification estimator 36 then calculates the channel estimates Cce using the final Fsa signal and delivers the estimates to the transmit unit 12 (step 154), via feedback channel 40, before processing of the next receive signal is initiated (step 130).

It should be appreciated that system 200 of FIG. 1, system 100 of FIG. 2, and the methods outlined in the flowcharts of FIGS. 9 and 10 are only meant to be illustrative of possible implementations of the present invention and should in no way be considered limiting. For example, the locations where the various functions are performed and the order in which steps are performed can be changed without departing from the spirit and scope of the invention. The determination of transmit parameters based on spectrum can, for example, be performed in the receive unit 16 of system 100. In this case, the transmit parameters are transferred to the transmit unit 12 via the feedback channel 40, where they are subject to verification. Alternatively, some of the functions of the system 100 can be performed in a central location that is separate from the transmit unit 12 and the receive unit 16.

In one embodiment of the invention, the transmit unit 12 and the receive unit 16 are each part of separate handheld communicators that are capable of full duplex operation. In a typical scenario, one communicator receives a communication signal from the other communicator, determines optimal transmit parameters from the received signal, and subsequently transmits a return communication signal to the other communicator having the optimal transmit parameters appended thereto. The first communicator then reads the appended parameters from the return signal, validates them, and uses them to create a next transmit signal.

It should be appreciated that the phrase "radio frequency", as used herein, is meant to include all portions of the electromagnetic spectrum that can be used for communications purposes such as, for example, those portions which comprise light.

What is claimed is:

1. A communications system comprising:
   a transmit unit for generating a signal and for transmitting said signal into a communications channel, said transmit unit being capable of varying at least one characteristic of said signal in response to a control signal;
   a receive unit for receiving said signal from said communications channel and for processing said signal to extract information from said signal;
   means for determining a spectral profile in said communications channel, said spectral profile being indicative of spectral content in said channel;
   means for generating said control signal based upon said spectral profile; and
   means for dynamically adjusting at least one receive parameter based upon said spectral profile; and
   said means for dynamically adjusting includes means for adjusting channel detection thresholds in said multichannel receiver.

2. The receive unit, as claimed in claim 1, wherein:
   said at least one characteristic of said transmit signal includes at least one of the following: data rate, symbol rate, center frequency, sampling frequency, bandwidth, and power level.

3. The communications system, as claimed in claim 1, wherein:
   said means for determining is located in said receive unit.

4. The communications system, as claimed in claim 1, wherein:
   said means for determining is located in said transmit unit.

5. The communications system, as claimed in claim 1, wherein:
   said means for generating is located in said transmit unit.

6. The communications system, as claimed in claim 1, wherein:
   said means for determining comprises a spectrum analyzer.

7. The communications system, as claimed in claim 1, wherein:
   said means for generating said control signal includes a microprocessor.

8. The communications system, as claimed in claim 1, wherein:
   said receive unit comprises a multi-channel receiver.

9. The communications system, as claimed in claim 1, wherein:
   said communications system overlays at least one of the following: a partialband communications system and a narrowband communications system.

10. A subsystem for use in a communications system that is operative in a predetermined frequency band, said subsystem comprising:
   a spectrum analysis unit for monitoring spectral content within said predetermined frequency band;
   a processor for determining transmit signal parameter values for achieving a predetermined performance goal based on said spectral content;
   a signal modulation/coding unit, responsive to said processor, for generating a transmit signal based on said transmit signal parameter values;
   a memory associated with said processor for storing at least one transmit signal parameter determination algorithm; and
   said memory includes a plurality of algorithms that each correspond to a different system performance goal.

11. The subsystem, as claimed in claim 10, wherein:
   said spectrum analysis unit is located within a receive unit in said communications system.

12. The subsystem, as claimed in claim 11, wherein:
   said signal modulation/coding unit is located in a transmit unit in said communications system, wherein said transmit unit is physically separate from said receiver unit.

13. The subsystem, as claimed in claim 12, wherein:
   said transmit unit and said receive unit are each part of separate handheld communicators that are each capable of duplex operation.

14. The subsystem, as claimed in claim 10, wherein:
   said spectrum analysis unit is located within a transmit unit in said communications system.

15. The subsystem, as claimed in claim 10, wherein:
   said signal modulation/coding unit includes a source coder for performing variable rate data compression on a data signal in accordance with a control signal from said processor.

16. The subsystem, as claimed in claim 10, wherein:
   said signal modulation/coding unit includes a channel coder/interleaver for performing variable channel coding/interleaving on a data signal in accordance with a control signal from said processor.

17. The subsystem, as claimed in claim 10, wherein:

said signal modulation/coding unit includes a multi-mode modulator for performing variable modulation functions on a data signal in accordance with a control signal from said processor, wherein said variable modulation functions include adjusting at least one of the following for the data signal: data rate, symbol rate, center frequency, sampling frequency, bandwidth, power level, modulation type, processing gain, and spreading waveform type.

18. A method for use in a communications system that is operative in a predetermined frequency band, wherein said communications system includes a transmit unit, a receive unit, and a communications channel for use in carrying a signal between the transmit unit and the receive unit, said method comprising the steps of:

receiving a first signal from the channel in the receive unit;

performing a spectrum analysis on said first signal to identify potentially interfering spectral components in the predetermined frequency band;

determining transmit signal parameter values based on potentially interfering spectral components identified in said performing step;

generating a transmit signal in the transmit unit using said transmit signal parameter values; and said step of determining includes determining transmit signal parameter values that result in a transmit signal having a spectral content that occupies portions of the electromagnetic spectrum that are not substantially occupied by the potentially interfering spectral components.

19. The method, as claimed in claim 18, wherein:

said step of determining includes calculating transmit signal parameter values to achieve a desired performance goal.

20. The method, as claimed in claim 18, wherein:

said step of determining includes determining a processing gain for the transmit signal.

* * * * *